United States Patent [19]
Horwatt et al.

[11] Patent Number: 5,412,012
[45] Date of Patent: * May 2, 1995

[54] FLAME RETARDANT INSULATION COMPOSITIONS HAVING IMPROVED STRIPPABILITY

[75] Inventors: Steven W. Horwatt, West Chester; James W. Biggs, Lebanon, both of Ohio

[73] Assignee: Quantum Chemical Corporation, Cincinnati, Ohio

[ * ] Notice: The portion of the term of this patent subsequent to Jul. 6, 2010 has been disclaimed.

[21] Appl. No.: 185,573

[22] Filed: Jan. 24, 1994

[51] Int. Cl.$^6$ ................................................ C08K 5/54
[52] U.S. Cl. .................................. 524/265; 174/110 R; 524/110; 524/289; 524/291; 524/305; 524/436; 524/437
[58] Field of Search ............... 524/265, 289, 291, 305, 524/302, 303, 437, 436; 174/110

[56] References Cited

U.S. PATENT DOCUMENTS

| | | |
|---|---|---|
| 3,441,575 | 4/1969 | Dexter et al. .......... 524/289 |
| 3,832,326 | 8/1974 | North et al. . |
| 3,922,442 | 11/1975 | North et al. . |
| 4,140,818 | 2/1979 | Davé .................. 524/106 |
| 4,349,605 | 9/1982 | Biggs et al. . |
| 4,381,362 | 4/1983 | Biggs et al. . |
| 5,041,617 | 8/1991 | Dunski et al. ......... 524/289 |
| 5,225,468 | 7/1993 | Biggs . |

OTHER PUBLICATIONS

*Argus Product Data*, pp. 1–4, Argus Chemical Division, Witco Chemical Corporation, New York (Jul. 1980).
*Irganox ® 1010, Antioxidant and Thermal Stabilizer*, 10 pages, Ciba–Geigy product literature.
*Irganox ® 1035, Antioxidant and Thermal Stabilizer*, 9 pages, Ciba–Geigy product literature.

*Primary Examiner*—Veronica P. Hoke
*Attorney, Agent, or Firm*—Gerald A. Baracka; William A. Heidrich

[57] ABSTRACT

The present invention relates to flame retardant insulation and jacketing compositions useful for wire and cable products which exhibit improved adhesion to the metal conductor. This is achieved by the use of a specific stabilizer package comprised of three specific antioxidants and by varying their relative proportions. The compositions are based on ethylene-vinyl esters and ethylene-alkyl acrylate copolymers and are formulated with a hydrated inorganic filler, an alkoxy silane, a crosslinking agent and the three-component stabilizer package. Antioxidants utilized for the three-component stabilizer package include tetrakis[methylene(3,5-di-tert-butyl-4-hydroxyhydrocinnamate)]methane, pentaerythritol tetrakis(betalaurylthiopropionate) and thiodiethylene bis(3,5-di-tert-butyl-4-hydroxyhydrocinnamate).

16 Claims, No Drawings

FLAME RETARDANT INSULATION COMPOSITIONS HAVING IMPROVED STRIPPABILITY

BACKGROUND OF THE INVENTION

Field of the Invention

This invention relates to improved polymeric compositions which are crosslinked to produce heat and flame resistant insulation for wire and cable products. More particularly, the invention relates to crosslinkable flame retardant ethylene-vinyl ester and ethylene-alkyl acrylate copolymer insulation compositions having improved strip characteristics and a process for modifying the strippability of said compositions.

Description of the Prior Art

Fire resistant polymer compositions are widely used for wire and cable insulation. In electrical environments both insulating and fire resistant properties are considered to be essential. Additionally, the compositions should not deteriorate under the service conditions.

A widely used fire retarding insulation for wire and cable is comprised of a crosslinkable polymer, such as ethylene-vinyl acetate copolymer, one or more silanes, one or more hydrated inorganic fillers, and a crosslinking agent. Other additives such as pigments, processing oils, lubricants, stabilizers and antioxidants are also generally included in these formulations. Compositions of this type which find use as single layer insulation and jacketing for copper wire are disclosed in U.S. Pat. Nos. 3,832,326 and 3,922,442 to North et al and U.S. Pat. Nos. 4,349,605 and 4,381,362 to Biggs et al. The compositions exhibit good processability and meet SAE J-1128 low tension primary cable standards.

To meet the service requirements of SAE J-1128, antioxidants/stabilizers are necessarily incorporated in the formulations. Antioxidants disclosed in the North et al and Biggs et al references include polymerized 1,2-dihydro-2,2,4-trimethyl quinoline, distearyl-3,3'-thiodipropionate (DSTDP), and combinations of DSTDP with hindered phenols, such as tetrakis[methylene(3,5-di-t-butyl-4-hydroxyhydrocinnamate)]methane. Use of DSTDP with sterically hindered phenols is disclosed in U.S. Pat. No. 4,381,362 for the preparation of compositions which pass the CSA varnish test. Other thio compounds, such as dilauryl-3,3'-thiodipropionate, dimyristylthiodipropionate, ditridecylthiodipropionate, bis alkyl sulfides, and hindered phenols, such as 2,6-di-t-butyl-p-cresol, octadecyl 3,5-di-t-butyl-4-hydroxyhydrocinnamate, 2,2'-methylene bis(6-t-butyl-4-methylphenol), 4,4'-butylidene bis(6-t-butyl-3-methyl phenol), 1,3,5-trimethyl-2,4,6-tris(3,5-di-t-butyl-4-hydroxybenzyl)benzene, and 2,2'-methylene bis(4-methyl-6-t-butylphenol) have also been disclosed.

While effective stabilization is obtained using combinations of dialkylthiodipropionates and hindered phenols, discoloration of the copper conductor has been observed when the insulated wire or cable is steam cured. The presence of discoloration or tarnish on the surface of the copper conductor is undesirable and is a problem in the manufacture of electrical boards or harnesses using automated systems when making solder or weld connections. U.S. Pat. No. 5,225,468 to Biggs overcomes the discoloration problem by using specific antioxidant combinations comprising a pentaerythritol betaalkylthiopropionate and specific hindered phenols which are essentially sulfur- and phosphorus-free. A particularly useful combination is pentaerythritol tetrakis (betalaurylthiopropionate) (SEENOX®412S) and tetrakis[methylene (3,5-di-t-butyl-4-hydroxyhydrocinnamate)]methane (IRGANOX®1010) employed at a weight ratio of from 3:1 to 1.5:1.

Whereas the antioxidant combinations of U.S. Pat. No. 5,225,468 impart a high degree of resistance to oxidative degradation without discoloring the copper conductor, adhesion of the insulation to the conductor is outside most manufacturer's specifications for type TXL thin wall crosslinked ethylene polymer insulations. The minimum strip force specified by SAE J-1128 for 20-24 AWG (0.50-0.22 mm) TXL wire pulled at a rate of 50 mm (2 in) per minute is 10 Newtons; however, most wire producers require that the strip force be in the range 20-30 Newtons. A minimum strip force of at least 20 Newtons is essential to eliminate "shrinkback" and the adhesion should not exceed about 30 Newtons to avoid excessive wire breakage during stripping.

It would be highly useful if non-tarnishing flame retardant insulation compositions with strip force values in the range 20-30 Newtons were available. It would be even more desirable if the strip force of the compositions could be modified as required. This later feature would make it possible to achieve optimal adhesion for particular applications. These and other advantages are achieved with the present invention.

SUMMARY OF THE INVENTION

It is an object of the present invention to provide improved crosslinkable flame retardant polymeric compositions based on ethylene-vinyl ester copolymers and ethylene-alkyl acrylate copolymers which have good processing characteristics and resistance to oxidative degradation. It is a further object to provide compositions useful as insulating and jacketing materials which, after steam cure, do not tarnish or discolor the copper conductor and which have a strip force, determined at a rate of pull of 2 in. per minute with 20-24 AWG wire, of 20-30 Newtons.

In accordance with this invention, the above objectives are realized by the use of a three-component stabilizer package comprised of tetrakis[methylene(3,5-di-tert-butyl-4-hydroxyhydrocinnamate)]methane, pentaerythritol tetrakis(betalaurylthiopropionate) and thiodiethylene bis(3,5-di-tert-butyl-4-hydroxyhydrocinnamate).

The flame retardant insulation compositions of the invention are comprised of (a) an ethylene copolymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof; (b) 80 to 400 phr hydrated inorganic filler; (c) 0.5 to 5 phr of an alkoxy silane; (d) 1 to 8 phr chemical crosslinking agent; and (e) 1 to 8 phr of the antioxidant package. More specifically, the three-component stabilizer combination employed for the composition of the invention consists of 0.8 to 5 phr tetrakis[methylene(3,5-di-tert-butyl-4-hydroxyhydrocinnamate)]methane, 0.1 to 2 phr pentaerythritol tetrakis(betalaurylthiopropionate) and 0.1 to 3 phr thiodiethylene bis(3,5-di-tert-butyl-4-hydroxyhydrocinnamate). In a particularly useful embodiment of the invention the total amount of stabilizers present in the formulation is from 1.5 to 4 phr.

There is also provided a process whereby the adhesion of crosslinked flame retardant insulation composition can be modified. This process comprises adjusting the relative amounts of pentaerythritol tetrakis(-betalaurylthiopropionate) and thiodiethylene bis(3,5-di-tert-butyl-4-hydroxyhydrocinnamate) in the above-identified formulation. By changing the ratio of pentaerythritol tetrakis(betalaurylthiopropionate) and thiodiethylene bis(3,5-di-tert-butyl-4-hydroxyhydrocinnamate) in the three-component stabilizer package, adhesion of the composition to the metal conductor can be controlled without significantly altering the other desirable properties of the composition.

DETAILED DESCRIPTION OF THE INVENTION

The present invention relates to improved flame retardant insulating compositions comprising copolymers of ethylene and a vinyl ester of an aliphatic carboxylic acid, an alkyl acrylate or an alkyl methacrylate, a silane, a hydrated inorganic filler, a crosslinking agent and a selected stabilizer package comprised of three known antioxidants and to the resulting crosslinked product.

The terms crosslink, cure and vulcanize and their derivative forms are employed synonymously herein and are ascribed their normal art-recognized meaning, i.e., they denote the formation of primary valence bonds between polymer molecules. Also, the terms antioxidant and stabilizer are used interchangeably to denote compounds which protect the formulation against the deleterious effects of heat, air and light. When reference is made to antioxidant or stabilizer packages or mixtures, it is intended that the ingredients may be added to the formulation individually or they may be combined prior to incorporation. All parts and percentages referred to are on a weight basis unless otherwise indicated.

THE ETHYLENE COPOLYMER

The polymer used to obtain the crosslinkable compositions of the invention is a copolymer of ethylene and a comonomer which may be a vinyl ester or an alkyl acrylate, the latter being used in the generic sense to encompass esters of both acrylic and methacrylic acid. The vinyl ester may be a vinyl ester of a $C_2$-$C_6$ aliphatic carboxylic acid, such as vinyl acetate, vinyl propionate, vinyl butyrate, vinyl pentanoate or vinyl hexanoate. The acrylates may be any of the $C_1$-$C_6$ alkyl esters of acrylic or methacrylic acid including, for example, methyl, ethyl, propyl, butyl, pentyl or hexyl acrylate or methacrylate.

A preferred copolymer comprising the polymeric component of this invention is an ethylene-vinyl acetate copolymer (EVA) containing about 9% to about 45% and, more preferably, 9% to about 30%, vinyl acetate, with the balance being ethylene. Terpolymers of ethylene, vinyl acetate and other known olefinic monomers polymerizable therewith can also be employed. Generally, if a third monomer is present, it will not constitute more than about 15% of the polymer composition.

Another preferred copolymer is derived from the copolymerization of ethylene and butyl acrylate. Useful ethylenebutyl acrylate copolymers (EBA) will contain about 10% to about 45% and, more preferably, 20% to 40% butyl acrylate—the balance being ethylene. n-Butyl acrylate is a preferred comonomer.

Blends of EVA and EBA can also be advantageously utilized. The EVA will generally comprise the major component of the blend, and typically will constitute greater than 75% of the blend.

It is also possible to include minor proportions of other crosslinkable polymers or copolymers in the composition of this invention; however, the ethylene copolymer should comprise at least 50% of the total polymers present. Representative of such minor polymeric components which can be used in such embodiments include polyethylene, polypropylene, ethylene-propylene copolymers and terpolymers, and the like. Low density polyethylene and linear low density polyethylene having melt indexes from 0.5 to 5 provide particularly desirable blends when present in amounts of 30% or less, based on the total polymer.

The ethylene copolymers and blends thereof will typically have melt indexes in the range 0.1 to 7 g/10 min. EVA copolymers most generally have melt indexes from about 0.5 to 5 whereas melt indexes of EBA copolymers will generally range from 0.1 to 3.

THE HYDRATED INORGANIC FILLER

Fillers used in the present invention are hydrated inorganic fillers, e.g., hydrated aluminum oxides ($Al_2O_3 \cdot 3H_2O$ or $Al(OH)_3$), hydrated magnesia, hydrated calcium silicate, hydrated magnesium carbonates, or the like. Hydrated alumina is most commonly employed. Water of hydration chemically bound to these inorganic fillers is released endothermically upon combustion or ignition of the ethylene copolymer to impart flame retardance. Minor amounts of other types of fillers may be tolerated. The filler size should be in accordance with those sizes used by the prior art.

The amount of hydrated organic filler employed can be varied within wide limits but, most generally, will range from 80 to 400 phr. In a particularly useful embodiment of the invention the hydrated inorganic filler comprises from 80 to 200 phr.

THE SILANE COMPONENT

An alkoxy silane is also included in the compositions of the invention. Any alkoxy silane which does not adversely affect the desired balance of properties and which facilitates binding the polymer and inorganic filler can be used with the proviso that the silane can not be combustible or degrade during polymer processing or interfere with polymer crosslinking. Mixtures of alkoxy silanes can be employed.

Alkoxysilanes used in insulating compositions include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyltriethoxysilane, methyltris (2-methoxyethoxy) silane, dimethyldiethoxysilane, ethyltrimethoxysilane, vinyltris (2-methoxyethoxy) silane, phenyltris (2-methoxyethoxy) silane, vinyltrimethoxysilane and vinyltriethoxysilane, and gamma-methacryloxypropyltrimethoxysilane.

It is preferred to use vinyl alkoxysilanes. Of the vinyl alkoxysilanes, gamma-methacryloxypropyltrimethoxysilane of the formula

vinyltris(2-methoxyethoxy)silane of the formula
H$_2$C=CHSi(OCH$_2$CH$_2$OCH$_3$)$_3$;
vinyltrimethoxysilane of the formula
H$_2$C=CHSi(OCH$_3$)$_3$; and
vinyltriethoxysilane of the formula
H$_2$C=CHSi(OCH$_2$CH$_3$)$_3$
are especially useful. Vinyltrimethoxysilane and vinyltriethoxysilane are particularly advantageous.

The alkoxy silane will be present in an amount from 0.5 to 5 phr and, more preferably, from 0.75 to 4 phr.

THE CROSSLINKING AGENT

The ethylene-vinyl ester and ethylene-alkyl acrylate copolymers are chemically crosslinked using conventional procedures known to the art. Chemical crosslinking can be accomplished by the use of conventional agents known to generate free radicals upon decomposition. Organic peroxides are most commonly employed for this purpose. Chemical crosslinking is accomplished by incorporating the organic peroxide or other crosslinking agent into the composition at a temperature below the decomposition temperature and later activating to cure the composition, i.e., crosslink the ethylene copolymer into a three-dimensional network.

The chemical crosslinking is carried out in accordance with well known procedures and variations in the general conditions necessary to effect same will be apparent to those skilled in the art. Known crosslinking coagents, such as triallylcyanurate and the like, may be included to increase the effectiveness of the cure.

Tertiary organic peroxides are especially useful chemical crosslinking agents. Dicumyl peroxide and alpha, alpha'-bis(t-butylperoxy) diisopropylbenzene are particularly advantageous. As with most other chemical crosslinking agents, the tertiary organic peroxides are activated by heating to above their activation temperature whereupon decomposition occurs. Any of the known procedures to accomplish decomposition, such as the application of high pressure steam or the like, can be used.

The chemical crosslinking agent is generally employed in an amount not to exceed 8 phr and, more preferably, at a level from 1 to 6 phr. In an especially preferred embodiment, 1.5 to 5 phr organic peroxide is used.

THE ANTIOXIDANT PACKAGE

The improved formulations of the invention necessarily contain a combination of three antioxidants. It has unexpectedly been discovered that by including a specific sulfur-containing hindered phenol with the stabilizers of U.S. Pat. No. 5,225,468 improved adhesion of the insulation to the metal conductor can be obtained without significantly altering the other desirable properties of the composition. The resulting improvement is particularly noteworthy since it makes it possible for the compositions to not only meet the requirements of SAE J-1128 but also to further satisfy manufacturer specifications which call for these compositions to have strip force values in the range 20 to 30 Newtons (determined using 20-24 AWG wire at a rate of pull of 2 in. per minute). Furthermore, the ability to obtain these improved results by incorporating a sulfur-containing hindered phenol with the stabilizers of U.S. Pat. No. 5,225,468 is totally unexpected since the patentee specifies that the stabilizer compositions should be essentially phosphorus- and/or sulfur-free and the linking group of the hindered phenol stabilizer should contain no sulfur or phosphorus atoms.

More specifically, the stabilizer combinations of the present invention contain 0.8 to 5 phr tetrakis[methylene(3,5-di-tert-butyl-4-hydroxyhydrocinnamate)]methane, 0.1 to 2 phr pentaerythritol tetrakis(betalaurylthiopropionate) and 0.1 to 3 phr thiodiethylenebis(3,5-di-tert-butyl-4-hydroxyhydrocinnamate). All of these stabilizer components are commonly available. Tetrakis [methylene(3,5-di-tert-butyl-4-hydroxyhydrocinnamate)]methane is sold by Ciba-Geigy Corporation under the tradename Irganox® 1010. Pentaerythritol tetrakis(betalaurylthiopropionate) is available from Argus Chemical Division, Witco Chemical Corporation and sold under the tradename SEENOX® 412S. Thiodiethylene bis(3,5-di-tert-butyl-4-hydroxyhydrocinnamate) is sold by Ciba-Geigy Corporation under the tradename Irganox® 1035. In an especially useful embodiment of the invention, tetrakis[methylene(3,5-di-tert-butyl-4-hydroxyhydrocinnamate)]methane is employed in an amount from 1 to 2.5 phr; pentaerythritol tetrakis(betalaurylthiopropionate) is employed in an amount from 0.1 to 1 phr; and thiodiethylene bis(3,5-di-tert-butyl-4-hydroxyhydrocinnamate) is employed in an amount from 0.2 to 2 phr.

The total amount of stabilizers employed for the compositions of the invention will generally range from 1 to 8 phr. More preferably, the total stabilizer content of the composition will range from 1.5 to 4 phr. The total antioxidant level will be determined based on the service requirements of the particular application. Higher antioxidant levels are generally required for high temperature wire and cable applications. The antioxidants may be added to the formulation separately or combined prior to incorporation.

FORMULATING AND PROCESSING THE COMPOSITIONS

The above-described components may be combined in a number of ways. The only requirement is that the filler and silane be intimately contacted. The silane may be added directly to the filler and dispersed in the polymer using a high shear internal mixer such as a Banbury, Farrel Continuous Mixer, Bolling Mixtrumat™ or Werner & Pfleiderer mixer and the crosslinking agent, antioxidants and any other additives then added. Alternatively, the silane can first be added to the polymer followed by addition of the filler and other additives. All ingredients can be added to the polymer/silane mixture at the same time using this latter approach provided the intensity and duration of the mixing are sufficient to provide intimate contact of the silane and filler.

In addition to the previously mentioned mixers, other processing devices known to the art capable of intimately mixing the essential components may be used. The compositions may also contain other additives, such as carbon black, pigments, lubricants, processing aids and the like, provided they do not interfere with crosslinking or detract from the physical properties of the composition. Processing aids which can advantageously be employed include fatty acids or fatty acid derivatives, polymeric processing resins and hydrocarbon oils, or combinations thereof. The fatty acid derivatives can include metal soaps, esters, ester-soaps, amides, and the like. The total amount of any additional ingredients will generally not exceed about 15 phr.

The degree of crosslinking is primarily determined by the amount of chemical crosslinking agent used. The higher the degree of crosslinking, the greater the toughness and the higher the resistance to moisture and chemical reagents. Too low a degree of crosslinking results in physical properties which are inadequate and subject to pronounced deterioration upon aging. The exact degree of crosslinking is therefore varied to take the above factors and their effect on the final product into account. For wire and cable insulation the level of crosslinking is generally greater than 80% although lower values are possible. Crosslinking is determined by extracting the polymer and determining the amount of insoluble gel. Crosslinking levels of 85% to 95% are most typical.

The compositions of the invention are most advantageously crosslinked using steam curing procedures. Steam curing is commonly employed for wire and cable production where continuous operation at high line speeds is required. Continuous vulcanization is generally carried out at superatmospheric pressures, on the order of 100 psi to 400 psi, although higher or lower pressures may be used. These pressures are employed to avoid developing products crosslinked compositions which are unsuitable for electrical insulation.

The crosslinked compositions are particularly useful for service as single layer low tension primary cable insulation. The compositions which are typically applied as a substantially uniform thickness of from 10 to 50 mils serve as an insulator and they physically protect the metal conductor. The compositions are particularly suited for automotive electrical applications and are especially useful for insulation of 20-24 AWG copper wire. They have a superior balance of processability and physical properties and do not discolor or tarnish the surface of the copper conductor upon steam cure. As a result, when the insulation is stripped from the end of the wire a clean shiny copper surface is obtained. Furthermore, it is possible with the invention to vary adhesion of the compositions so that optimal strip force values can be obtained. This latter feature is particularly advantageous in automated operations where a critical balance of shrinkback and strippability must be maintained.

In accordance with this invention it is possible by varying the relative proportion of the three stabilizer components to optimize adhesion of the compositions. This can be accomplished by changing the ratio of pentaerythritol tetrakis(betalaurylthiopropionate) to thiodiethylene bis (3,5-di-tert-butyl-4-hydroxyhydrocinnamate) for a particular level of tetrakis[methylene(3,5-di-tert-butyl-4-hydroxyhydrocinnamate) ]methane. The weight ratio of pentaerythritol tetrakis (betalaurylthiopropionate) to thiodiethylene bis (3,5-di-tert-butyl-4-hydroxyhydrocinnamate) can range from 0.1:1 to 0.2:1 but, more preferably, is in the range from 0.2:1 to 1:1.

The invention is described in greater detail in the examples which follow. These examples are for illustration purposes only and are not intended to limit the invention. Numerous variations are possible without deviating from the spirit and scope of the invention, as will be apparent to those skilled in the art.

EXAMPLES I AND II

Two products of the invention were prepared using the following ingredients:

| | PARTS | |
|---|---|---|
| | EXAMPLE I | EXAMPLE II |
| EVA copolymer (melt index 2.4; 18% VA) | 100 | 100 |
| Hydrated Alumina | 120 | 122 |
| Vinyltrimethoxysilane | 1.2 | 1.2 |
| Alpha, alpha'-bis(t-butylperoxy diisopropylbenzene | 1.8 | 1.6 |
| Tetrakis[methylene(3,5-di-tert-butyl-4-hydroxyhydrocinnamate)] methane | 1.5 | 1.7 |
| Pentaerythritol tetrakis (betalaurylthiopropionate) | 0.4 | 0.6 |
| Thiodiethylene bis(3,5-di-tert-butyl-4-hydroxyhydrocinnamate) | 0.4 | 1.7 |

The formulations were blended by adding all of the ingredients to a Banbury mixer and mixing for 3–5 minutes at a temperature of about 110° C. to 125° C. The homogeneous mixture was then sheeted on a roll mill and granulated.

Cured plaques were prepared from the granular product and physical properties (tensile and elongation) determined in accordance with ASTM D-638. The plaques were cured by heating for 6 minutes in a compression mold maintained at 250 psi and 200°–205° C. Under these conditions, cures of 80% or greater (determined in accordance with ASTM D-2765, Method C) with tensile strengths of at least 2000 psi, and more generally greater than 2500 psi, and elongations greater than 200% are typically achieved.

Resistance to thermal aging was measured by heating the cured plaques in a forced-air circulating oven for 7 days at 165° C. The extent of deterioration was determined by observing the decrease in tensile strength and elongation. Products are considered to be marginal when upon aging the elongation drops below 175% or the % retention of elongation is 75% or less.

The product of Example I had a tensile strength of 3130 psi and elongation at break of 230%. After heat aging for seven days at 165° C., 100% of the tensile strength was retained and 98% of the elongation was retained. The product of Example II had a tensile strength of 3000 psi and elongation at break of 235%. After heat aging, the product had 103% retention of tensile strength and 103% retention of elongation.

Both products are readily processable and suited for extrusion coating onto copper wire to produce smooth, shiny extrudates. Evaluation of extrudability on a laboratory scale is carried out using a 1 inch diameter Brabender extruder (20:1 L/D) operated at 100 rpm having three electrically heated zones maintained at 210° F., 220° F. and 230° F., respectively, and a die maintained at a temperature of 230° F. A Brabender wire insulating die assembly is employed and the insulation applied at a thickness of approximately 20 mils. Coated wires are cured in an autoclave for six minutes using 250 psi steam. At the conclusion of the cure cycle, the steam pressure is released, water is introduced and the autoclave is allowed to cool for 12 minutes. The insulated strands are then examined for ease of strippability and for any sign of discoloration or damage to the wire after removal of the insulation.

The above products were also used to coat fine gauge (20 AWG) copper wire on a high speed continuous coating line coupled to a CV cure line. Coated wire obtained from the operation was stored for 7 days under ambient conditions to insure the development of optimal physical properties and then evaluated in accordance with SAE J-1128. The wires met all of the requirements of SAE J-1128 for TXL thin wall insulation. Further, the product of Example I had a strip force of 28 Newtons and the product of Example I had a strip force of 24 Newtons—both values well within the 20 to 30 Newton range required by most manufacturers for applications of this type. Also, there was no discernable discoloration of the surface of the copper wire upon removal of the insulation. The surface of the conductor was bright and shiny in both instances.

COMPARATIVE EXAMPLE A

To demonstrate the improved adhesion obtained by the use of the three-component stabilizer system of the invention, an insulation composition was prepared utilizing the two-component stabilizer package of U.S. Pat. No. 5,225,468. The type and amount of ethylene copolymer, hydrated inorganic filler, alkoxy silane and organic peroxide were identical to that used for Example I. The comparative formulation differed only in the stabilizer package used. While the total amount of stabilizer used for the comparative formulation was essentially the same as employed for the product of Example I, the antioxidant system consisted of 1.5 phr tetrakis[methylene(3,5-di-tert-butyl-4-hydroxyhydrocinnamate)]methane and 0.75 phr pentaerythritol tetrakis(betalaurylthiopropionate). The resulting comparative product met all of the requirements of SAE J-1128; however, the strip force of wires produced on the high speed continuous coating line was only 14 Newtons. This value is considered to be inadequate by most manufacturers for applications of this type. It is generally recognized within the industry that a strip force of at least 20 Newtons is required to minimize or eliminate shrinkback problems.

COMPARATIVE EXAMPLE B

To further demonstrate the criticality of the three-component stabilizer systems of the invention, a formulation comparable to that of Example II was prepared except that the pentaerythritol tetrakis(betalaurylthiopropionate) was omitted. While the total amount of antioxidants used was the same as that of Example II, i.e., 4.0 phr, the antioxidant package consisted of 2.0 phr tetrakis[methylene(3,5-di-tert-butyl-4-hydroxyhydrocinnamate)]methane and 2.0 phr thiodiethylene bis(3,5-di-tert-butyl-4-hydroxyhydrocinnamate). The resulting product had good processability and heat stability and 20 AWG copper wire coated with the composition on the high speed continuous coating line met all of the requirements of SAE J-1128 except that the strip force was 97 Newtons. A strip force value of this magnitude is considered totally unacceptable for fine gauge wires since it will produce excessive wire breakage during stripping.

EXAMPLE III

To further illustrate the improved compositions of the invention and the ability to vary the relative amounts of the stabilizer components, a formulation was prepared as follows:

| | PARTS |
|---|---|
| EVA copolymer (melt index 2.4; 18% VA) | 100 |
| Hydrated Alumina | 125 |
| Vinyltrimethoxysilane | 1.2 |

-continued

| | PARTS |
|---|---|
| Alpha, alpha'-bis(t-butylperoxy) diisopropylbenzene | 1.25 |
| Tetrakis[methylene(3,5-di-tert-butyl-4-hydroxyhydrocinnamate)] methane | 1.45 |
| Pentaerythritol tetrakis (betalaurylthiopropionate) | 0.5 |
| Thiodiethylene bis(3,5-di-tert-butyl-4-hydroxyhydrocinnamate) | 0.25 |

The product was prepared and evaluated in accordance with the procedure of Example I. Wire coated with the composition satisfied all of the requirements of SAE J-1128. Additionally, coated wires produced on the high speed continuous coating line had a strip force of 23 Newtons which falls within the range generally recognized by most manufacturers to be most desirable.

COMPARATIVE EXAMPLE C

Example III was repeated omitting the thiodiethylene bis(3,5-di-tert-butyl-4-hydroxyhydrocinnamate) antioxidant component. The amount of pentaerythritol tetrakis(betalaurylthiopropionate) was increased to 0.75 phr so that the total antioxidant content of the comparative formulation was the same as used for Example III. Eliminating the thiodiethylene bis(3,5-di-tert-butyl-4-hydroxyhydrocinnamate) from the formulation decreased the adhesion to a level generally considered unacceptable for most fine gauge, i.e., 20–24 AWG, TXL cable types used for automotive electrical systems. The strip force value obtained using the comparative formulation was only 15 Newtons.

We claim:

1. An improved crosslinkable flame retardant insulation composition comprising:
   (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof;
   (b) 80 to 400 phr hydrated inorganic filler;
   (c) 0.5 to 5 phr alkoxy silane;
   (d) 1 to 8 phr chemical crosslinking agent;
   (e) 1 to 8 phr of a stabilizer package consisting of (i) tetrakis[methylene(3,5-di-tert-butyl-4-hydroxyhydrocinnamate)]methane, (ii) pentaerythritol tetrakis(betalaurylthiopropionate) and (iii) thiodiethylene bis(3,5-di-tert-butyl-4-hydroxyhydrocinnamate).

2. The composition of claim 1 wherein (a) is ethylene-vinyl acetate copolymer, ethylene-butyl acrylate copolymer, or mixtures thereof; (b) is a hydrated aluminum oxide, hydrated magnesia, hydrated calcium silicate, or hydrated magnesium carbonate; (c) is a lower alkyl-, alkenyl-, alkynyl- or aryl-alkoxysilane having from 1 to 3 $C_{1-6}$ alkoxy substituents; and (d) is an organic peroxide.

3. The composition of claim 2 wherein (i) is present in an amount from 0.8 to 5 phr, (ii) is present in an amount from 0.1 to 2 phr and (iii) is present in an amount from 0.1 to 3 phr.

4. The composition of claim 3 containing 80 to 200 phr (b); 0.75 to 4 phr (c); 1.5 to 5 phr (d); and 1 to 6 phr (e) wherein the weight ratio of (ii) to (iii) is from 0.1:1 to 2:1.

5. The composition of claim 4 wherein (a) is an ethylene-vinyl acetate copolymer containing from 9% to 30% vinyl acetate and having a melt index from 0.5 to 5, an ethylene-butyl acrylate copolymer containing 10% to 45% butyl acrylate and having a melt index of 0.1 to 3, or mixtures thereof.

6. The composition of claim 5 wherein (b) is hydrated alumina.

7. The composition of claim 5 wherein (c) is a vinylalkoxysilane.

8. The composition of claim 7 wherein the vinylalkoxysilane is vinyltrimethoxysilane.

9. The composition of claim 5 wherein (d) is a tertiary organic peroxide.

10. The composition of claim 9 wherein the tertiary organic peroxide is dicumyl peroxide or alpha, alpha'-bis(t-butylperoxy)diisopropylbenzene.

11. The composition of claim 5 containing 1.5 to 4 phr (e).

12. The composition of claim 5 wherein (i) is present in an amount from 1 to 2.5 phr, (ii) is present in an amount from 0.1 to 1 phr, (iii) is present in an amount from 0.2 to 2 phr, and the weight ratio of (ii) to (iii) is from 0.2:1 to 1:1.

13. The composition of claim 1 which is crosslinked.

14. A 20 to 24 AWG copper conductor substantially uniformly coated with a 10 to 50 mil thick insulating layer of a crosslinked flame retardant composition comprising:
   (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof;
   (b) 80 to 400 phr hydrated inorganic filler;
   (c) 0.5 to 5 phr alkoxy silane;
   (d) 1 to 8 phr chemical crosslinking agent;
   (e) 1 to 8 phr of a stabilizer package consisting of (i) tetrakis[methylene(3,5-di-tert-butyl-4-hydroxyhydrocinnamate)]methane, (ii) pentaerythritol tetrakis (betalaurylthiopropionate) and (iii) thiodiethylene bis(3,5-di-tert-butyl-4-hydroxyhydrocinnamate), said coated conductor meeting all of the requirements of SAE J-1128 for TXL thin wall low tension primary cable type insulation and further having a strip force measured at a pull rate of 2 inches per minute of 20 to 30 Newtons.

15. In a process for producing crosslinkable flame retardant compositions useful as insulation for wire and cable, said compositions comprising (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof; (b) a hydrated inorganic filler; (c) an alkoxy silane; (d) a crosslinking agent; (e)(i) tetrakis[methylene(3,5-di-tert-butyl-4-hydroxyhydrocinnamate)]methane; and (e)(ii) pentaerythritol tetrakis(betalaurylthiopropionate); to modify adhesion of the crosslinked compositions to the metal conductor, the improvement comprising incorporating 0.1 to 3 phr thiodiethylene bis(3,5-di-tert-butyl-4-hydroxyhydrocinnamate) with from 0.8 to 5 phr (e)(i) and from 0.1 to 2 phr (e)(ii) while maintaining the weight ratio of (e)(ii) to thiodiethylene bis(3,5-di-tert-butyl-4-hydroxyhydrocinnamate) in the range 0.1:1 to 2:1.

16. The process of claim 15 wherein (e)(i) is present in an amount from 1 to 2.5 phr, (e)(ii) is present in an amount from 0.1 to 1 phr, thiodiethylene bis(3,5-di-tert-butyl-4-hydroxyhydrocinnamate) is present in an amount from 0.2 to 2 phr and the ratio of (e)(ii) to thiodiethylene bis(3,5-di-tert-butyl-4-hydroxyhydrocinnamate) is in the range 0.2:1 to 1:1.

* * * * *